3,413,726
GAUGING DEVICE

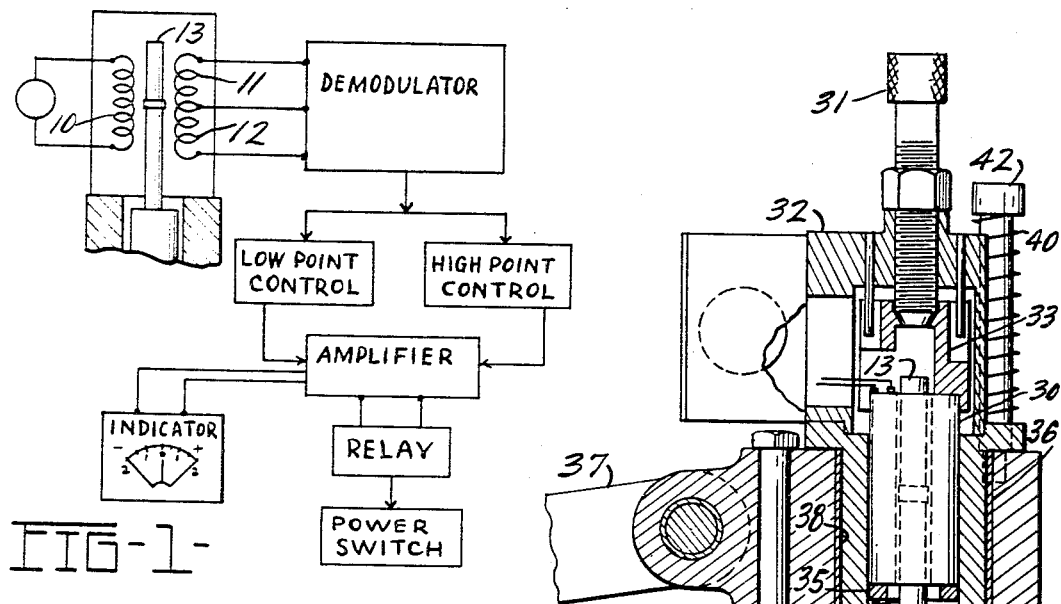
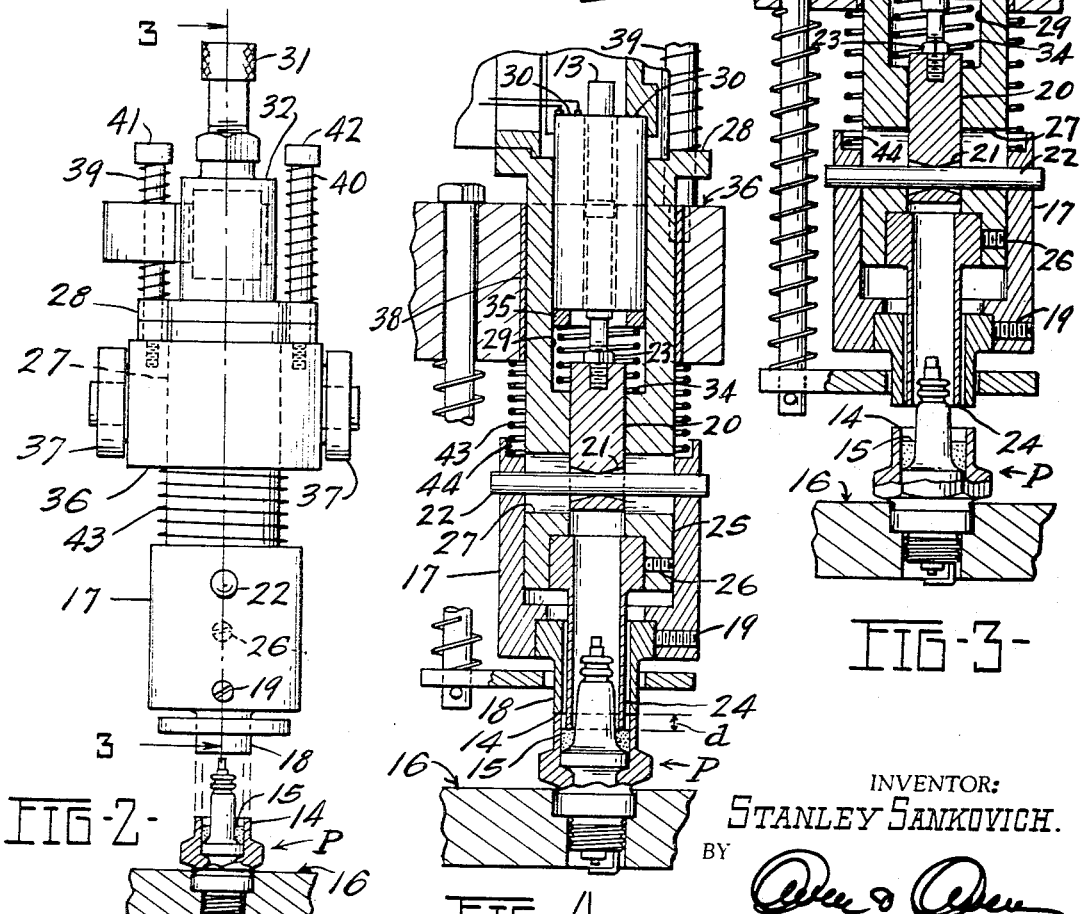

Stanley Sankovich, Toledo, Ohio, assignor to Champion Spark Plug Company, Toledo, Ohio, a corporation of Delaware
Filed Sept. 16, 1966, Ser. No. 579,900
3 Claims. (Cl. 33—169)

ABSTRACT OF THE DISCLOSURE

An apparatus for measuring and indicating the depth of a packing within a spark plug. The apparatus includes an inner hollow cylindrical gauging finger adapted to be received by the shell to abut the upper packing surface, an outer hollow cylindrical gauging finger circumjacent the inner finger and adapted to abut the upper shell edge. Both inner and outer fingers are resiliently biased against the upper packing and shell surfaces when the apparatus is in position. A differential transformer having movable core and casing is associated to move along with the gauging fingers whereby the relative position of the transformer core and casing and, thus, its electrical output, are proportional to the packing depth. A means for indicating the transformer output is provided to indicate packing depth. Means for adjusting the relative position of the transformer core and casing relative to the gauging fingers is also provided.

---

This invention relates to a gauging device for use in detecting and indicating the distance between a pair of surfaces contacted by the gauging device. More specifically, this invention relates to a mechanically operated gauging apparatus or transducer which includes a differential transformer whose electrical output is proportionate in magnitude and polarity to the relative position of two opposed moving parts, which position is determined by gauging fingers on the device which make contact with the surfaces being measured.

The use of differential transformer position detectors, whose electrical output is proportionate in magnitude and polarity to the position of a movable core in relation to a pair of electrically matched secondary coils, to indicate dimensional variation in a series of workpieces, is well known in the art. For instance, U.S. Patent 3,046,535 discloses a device for detecting dimensional variations in a flat surface which includes a differential transformer which electrically detects and indicates such variations. It is a primary object of this invention to provide a mechanical apparatus for controlling the movement of the movable core of the differential transformer in relation to the matched secondary coils which is particularly adapted for use in sequentially measuring the relative position of or the distance between two surfaces on each one of a series of mass produced items.

It is accordingly an object of this invention to provide a mechanical means for operatively positioning the movable parts of a differential transformer by providing gauging means which make uniform physical contact with a pair of surfaces whose relative position along a fixed axis is to be measured.

It is another object of this invention to provide a gauging apparatus for use in checking the dimensional variations between pairs of surfaces in a series of mass produced articles.

It is a further and more specific object of this invention to provide a gauging device for measuring the depth of a packing within a spark plug shell, which device includes a pair of movable gauging fingers adapted to make contact with the upper surface of the packing and the upper surface of the shell, whereby the distance between these two surfaces is translated by the device to fix the distance between the movable parts of a differential transformer, whereby the proportional output of the differential transformer may be used to detect and indicate the relative position of the two surfaces within the spark plug.

Other objects and advantages of this invention will be apparent from the following detailed description of a preferred embodiment, reference being made to the accompanying drawings, in which:

FIG. 1 is a schematic circuit diagram of the electrical components which may be used with the differential transformer of the gauging device to electrically detect and indicate the relative position of two surfaces as detected by the gauging device;

FIG. 2 is a view in elevation of the gauging device of this invention, shown in its upper position in alignment with a partially completed spark plug whose packing depth is to be measured;

FIG. 3 is a cross-sectional view in elevation, taken along lines 3—3 of FIG. 2, and showing the interior construction of the gauging device of this invention, on an enlarged scale; and FIG. 4 is a partial cross-sectional view similar to FIG. 3 but showing the gauging device in its lower position with the gauging fingers in contact with the surfaces of the spark plug.

Referring to FIG. 1, as is well known in the art, a differential transformer includes a primary coil 10 and a pair of oppositely wound secondary coils 11 and 12 whose output is connected to a demodulator which detects and compares the output of the coils 11 and 12 and passes a proportional output signal to a pair of push-pull type amplifiers which are set to generate an output signal only when the input signal from the demodulator is above or below a predetermined value. As is well known to those skilled in the art, when a source of alternating current is supplied to the primary coil 10, and the oppositely wound secondary coils 11 and 12 are electrically and physically equally associated with the primary coil 10, the output is opposite and equal. At this point, or "zero position," the output from the demodulator is effectively zero. If the electrical balance between the secondary coils 11 and 12 is disturbed, as by physical movement of the primary coil 10 in relation to the secondary coils 11 or 12, or by movement of a movable iron core which will change the electrical balance, the impressed voltage on the secondary coils 11 and 12 will be unequal and this difference in magnitude and polarity will be indicated by the demodulator. As shown in FIG. 1, the electrical balance between the secondary coils 11 and 12 is controlled by a movable core member 13 whose position above or below the neutral or "zero position," is controlled by the gauging device described below and shown in FIGS. 2–4.

As previously explained, the output from the secondary coils 11 and 12 and thus the demodulator will be proportionate in magnitude and polarity to the position of the movable core 13 above or below the zero position. Thus, the demodulator output may be sensed by the high point or the low point control circuit which will pass an output signal to the amplifier only if the signal from the demodulator is above a predetermined value and of the proper polarity. The output of the amplifier is, in turn, connected to an appropriate relay which is used to actuate a power switch, an indicator means, or any other appropriate means for indicating to the operator that the position of the two surfaces being measured is beyond a control limitation and, thus, that the machine should be stopped or recycled. For instance, the low point and high point control members may be programmed to generate an output only when the signal from the demodulator has a magnitude indicating that the two surfaces are outside of a desirable or acceptable dimensional tolerance, such as plus or minus five thousandths of an inch from the zero or predetermined position. In turn, the indicator means may comprise a galvanometer calibrated in thousandths of an inch. Thus, the system is adaptable for controlling the dimensional tolerance of a series of mass produced workpieces with an accuracy as high as plus or minus one thousandth of an inch.

The apparatus shown in FIGS. 2–4 is a mechanical gauging device for contacting the pair of surfaces to be measured on a production item, such as a spark plug, and positioning the core of the transducer 13 in accordance with the actual position of these surfaces to be measured so that the output of the transducer will indicate to the operator the position of these surfaces and will also stop or recycle the machine if the dimensional tolerances as previously explained have been exceeded. As illustrated in these figures, the gauging device is used to measure the distance between the upper surface of a spark plug shell, indicated by reference numeral 14, and the upper surface of a sillment packing within the shell, as indicated by refernce numeral 15. As illustrated in FIGS. 2–4, the spark plug P is held in a formed aperture in a supporting surface 16 which may be a rotary table or moving bed which sequentially presents each one of a series of spark plugs to the gauging device.

A gauging device itself includes a hollow cylindrical body 17 with an outer, hollow cylindrical gauging finger 18 coaxially secured at its lower end by means of setscrew or other appropriate keying device 19.

The movable core 13 of a differential transformer is held in fixed relation to the outer gauging finger 18 by an axially extending shaft 20 which has a lower recess 21 which receives a pin 22 which extends transversely to the upper side of the body 17. The lower end of the movable core 13 is secured within the upper end of the shaft 20 by a threaded connection which is held against movement by a lock nut 23.

An inner gauging finger 24 is secured at its upper end to an inner body 25 which is slidably positioned within the outer body 17. The inner gauging finger 24 is secured to the inner body 25 by means of a setscrew 26 and the lower end of the inner gauging finger 24 extends downwardly within the outer gauging finger 18 as seen in FIGS. 3 and 4. The inner body 25 has a large transverse passage 27 circumjacent pin 22 so that the inner body 25 and its attached inner gauging finger 24 may move up and down relative to the outer body 17 and its attached outer gauging finger 18. The upper end 27 of the inner body 25 has a circumferential ridge or land 28 and an enlarged axially extending bore 29. Within the bore 29 is positioned the transducer case or cylinder 30 in which the coils 10, 11, and 12 are positioned. The position of the transducer case 30 relative to the inner body 25 is determined by a manually adjustable turn-down screw 31 which is threaded into a jig 32 secured to the upper portion 27 of the inner body 25. The lower end of the adjusting screw 31 rests upon a slidable bushing 33 whose lower edges contact the transducer case 30. On the lower side of the transducer case 30, a resilient spring 34 is compressed between the end surface of the axial bore 29 in the inner body 25 and a spring seat 35 which rests against the transducer case 30. Thus it will be seen that movement of the adjustable screw 31 will move the transducer case 30 relative to the inner body 25 against the force exerted by the spring 34.

The entire gauging device is supported on a movable casting, generally indicated by the reference numeral 36, which casting is secured to a pivot arm 37 or other suitable device for moving the casting up and down, toward and away from the position of the spark plug P as it is held by the rotary table 16. The outer surfaces of the upper portion 27 of the inner body 25 are slidably received by a passage 38 in the casting 36 with the flange or land 28 resting upon the upper surface of the casting 36. As best seen in FIG. 2, the gauging device is held in a lower position relative to the casting 36 by a pair of compressible springs 39 and 40 circumjacent a pair of vertically extending studs or spring guides 41 and 42 which extend through apertures in the lands 28 of the inner body 25 and are threaded into the upper surface of the casting 36. Thus the inner body 25 and its attached inner gauging finger 24 are held in a downward position relative to the casting 36 by the springs 39 and 40 but may be moved upwardly relative to the casting 36 by compressing these springs.

The outer body 17 and its attached outer gauging finger 18 are held in a downward position relative to the casting 36 by a compression spring 43 which is circumjacent the inner body 25 and is compressed between the lower surface of the movable casting 36 and the uppermost surface of the outer body 17 which has a circular groove 44 to receive the spring 43. The spring 43 is held in compression between the lower surface of the casting 36 and the groove 44 which presses the pin 22 against the lower surface of the transverse passage 27.

The operation of the gauging device as heretofore described is as follows. In this specific example, the gauging device is shown as used to determine the depth of a packing within a spark plug shell or, the distance between the upper surface of the packing 15 and the upper shell surface 14. This distance is designated as $d$ in FIG. 4. If, for example, it is determined that the optimum distance between the surfaces 14 and 15 is 0.079 inch, to allow for proper crimping of the spark plug shell, the gauging device is so calibrated by adjustment of the adjusting screw 31 so that the zero position of the differential transformer coils or the relative position between the movable core 13 and the transducer case 30 will be attained when the distance between the lower ends of the inner gauging finger 24 and the outer gauging finger 18 is 0.079 inch, measured in an axial direction. This adjustment may be done by use of a dummy or standard pattern. With the zero position or $d$ set at 0.079 inch, the low point and high point electrical control may then be set to be activated when the signal from the demodulator indicates that the actual variation between the surfaces 14 and 15 is beyond plus or minus a certain dimensional tolerance, such as five thousandths of an inch. Thus, the apparatus will indicate and stop or recycle the appropriate machinery if the actual distance $d$ between the surfaces 14 and 15 of a given plug are less than 0.074 inch or more than 0.084 inch. With these adjustments and calibrations completed, the gauging device is used as follows.

FIG. 3 shows the gauging device held in its lowermost position with respect to the casting 36 as the casting 36 is moving downwardly toward the plug P. Prior to making contact with the surfaces 14 and 15 on the plug P, the outer gauging finger 18 is urged to its lowermost position with respect to the movable casting 36 by the spring 43 and the inner gauging finger 24 is urged to its lowermost position by the springs 39 and 40. When the movable casting 36 has been lowered by the pivot arm 37 to the position shown in FIG. 4 where the inner and outer gauging fingers 24 and 18 make contact with the surfaces 15 and 14 at the plug P, respectively, the springs 39, 40, and 43 are compressed and firmly urge the gauging fingers against their respective surfaces on the plug. As shown in FIG. 4, the spring 43 is compressed between the lower surface of the casting 36 and the groove 44 in the uppermost surface of the outer body 17. With the casting 36 in this position, the outer body 17 and its attached outer gauging finger 18 are urged against the upper surface 14 of the spark plug shell under uniform pressure, regardless of the exact position of the casting 36 with respect to this shell surface 14. Likewise, the springs 39 and 40 urge the lands 28 of the upper end 27 of the inner body 25, and thus the attached inner gauging finger 24 firmly against the upper surface 15 of the packing of the spark plug P, regardless of the exact position of the casting 36 with respect to this surface 15. Thus it will be seen that it is the force from the springs 39, 40, and 43 which keeps the gauging fingers 18 and 24 in contact with the surfaces 13 and 15, respectively, and not force directly exerted from the casting 36. Because of this spring biasing arrangement, both of the fingers 18 and 24 "float" with respect to the moving casting 36. This "floating" action is advantageous in that it enables the gauging fingers to detect the relative position between the surfaces 15 and 14, regardless of the distance between either of these surfaces and the lowermost position of the movable casting 36, within the dimensional limits of the spring compression.

As previously explained, the relative position between the core 13 and the transducer case 30 has been set so that the zero position for the differential transformer is attained when the distance $d$ between the surfaces 14 and 15 is 0.079 inch. Thus, on a given spark plug shell, if the actual distance between these surfaces 14 and 15 is not 0.079 inch, the position of the fingers 18 and 24 will detect a difference, which difference will be electrically indicated by a difference in position of the core 13 and the transducer case 30 from its preset zero position.

It will be seen that there are several advantages to the device of this invention in addition to the advantages heretofore mentioned. One such additional advantage is that, due to the removable construction of the gauging fingers 18 and 24, the device may be adapted for use in other installations or in installations for gauging spark plug packing depth in which additional or less reach of the gauging fingers is needed. The gauging fingers 18 and 24 may be removed for servicing, cleaning, or other repair without dismantling the entire device. Finally, through the adjustments made possible by the adjusting screw 31 and the electrical adjustments for setting the high and low control points, the device offers versatility for use in a large number of dimensional control applications.

I claim:

1. An apparatus for measuring and indicating the depth of a packing within a spark plug having an exterior shell open at one end, a ceramic insulator positioned within said shell and a packing surrounding said insulator with its axially upper surface lying below the uppermost edge of said exterior shell, said apparatus comprising, in combination, a hollow cylindrical inner gauging finger adapted to receive said spark plug insulator and to abut the upper surface of said packing, a hollow, cylindrical outer gauging finger circumjacent said inner finger and adapted to abut the uppermost edge of said spark plug shell, resilient means urgnig said outer and inner fingers into engagement with the uppermost edge of the spark plug shell and the upper surface of the packing, respectively, said resilient means including a first coil spring urging said outer finger toward said spark plug shell and a second coil spring engaging portions of said outer finger and said inner finger whereby movement of said outer finger toward said spark plug shell will cause said second coil spring to move said inner finger toward said spark plug packing, a differential transformer having an inner core and an outer case movable relative to one another and with an electrical output proportional to the relative position between said inner core and said outer case, means securing said transformer inner core to said outer finger and securing said transformer outer case to said inner finger whereby the relative position between said inner core and said outer case is determined by and is proportional to the relative position between said inner and outer fingers, and means for detecting the proportional output of said differential transformer to indicate the distance between the uppermost edge of said spark plug shell and the upper surface of said packing.

2. The apparatus of claim 1 which further includes a means for adjusting the relative position of the inner core and the outer case of said differential transformer independently of relative movement of said inner and outer fingers.

3. The apparatus of claim 1 wherein said transformer inner core is secured relative to said outer finger by a third resilient means compressed between a member fixed to said inner core and a portion of said outer finger and which further includes a means for moving said inner core relative to said outer finger against said third resilient means to vary the relative position thereof independently of the relative movement of said inner and outer fingers.

References Cited

UNITED STATES PATENTS

| | | |
|---|---|---|
| 2,499,665 | 3/1950 | Mestas. |
| 2,508,370 | 5/1950 | Bozoian. |
| 2,512,879 | 6/1950 | Roggenstein. |
| 2,833,046 | 6/1958 | Jeglum. |
| 3,058,225 | 10/1962 | Ward. |

WILLIAM D. MARTIN, JR., *Primary Examiner.*